UNITED STATES PATENT OFFICE.

JENS HERMAN CHRISTENSEN, OF SÖLLERÖD PR. HOLTE, DENMARK.

MANUFACTURE OF COLOR PLATES OR SCREENS FOR COLOR PHOTOGRAPHY.

994,977.

Specification of Letters Patent. Patented June 13, 1911.

No Drawing. Application filed February 16, 1909. Serial No. 478,154.

*To all whom it may concern:*

Be it known that I, JENS HERMAN CHRISTENSEN, a subject of the King of Denmark, residing at Söllerød pr. Holte, Denmark, have invented a new and useful Improvement in or Relating to the Manufacture of Color Plates or Screens for Color Photography; and I do hereby declare the following to be a full, clear, and exact description of the same.

The invention relates to a method of making color plates of screens in three (or more) colors for color photography. The production of such plates has been attempted in some cases by applying to the plate a line-engraving in the colors in question or, by Lumière, by covering the plate with organic particles, for instance starch-grains, which have beforehand been dyed with the colors desired.

According to the present invention colored elements are used, which are in a liquid state when being applied to the plate, or are brought into a liquid state when applied to the plate. By way of example the producing of a multicolored screen plate of this kind will now be described.

In 100 parts of water 25 parts of gum arabic and 25 parts of dextrin are dissolved. The viscous liquid is divided into three parts, which are dyed with the dyes in question, when the colored solutions are separately emulsified in gum dammar. This emulsifying can be effected by the solution of gum arabic and dextrin being pressed through a fine hole into a lac solution, the latter being agitated, or simply by shaking the solution of gum arabic and dextrin together with the lac solution, whereby the former will divide into fine globules. When the gum-dammar is of a suitable concentration, colored globules of about uniform size are obtained, so as to avoid a subsequent separation of the globules according to size. After the emulsifying step, the mass is preferably thinned, and to this end is added one or more times to the three portions, the globules being allowed to sink to the bottom, and the liquid above being removed by decantation. This decantation with turpentine aims at removing most of the resin (gum-dammar). Finally the different colored globules are suspended separately in benzin, to which is added a quantity of a substance, less volatile than benzin, for instance kerosene or some solid substance soluble in benzin for instance a resin or a very fine emulsion of some solid substance. A suitable mixture is constituted by 100 parts of benzin, 10 parts of tetrachlorid of carbon, 10 parts of kerosene, and 0.5 part of asphalt lac. The three portions are mixed and poured over a plate, which has previously been provided with a thin cover of caoutchouc or the like. This caoutchouc-cover swells and retains the undermost globules, while the remainder of the globules float off the plate, when the same is held in an oblique position. In many cases the caoutchouc-coating can be dispensed with, the globules spontaneously adhering to the screen-plate. The adding of the less volatile substance has the effect of preventing the individual globules from diffusing into each other. This flattening or spreading of the globules can be further encouraged by exposing the plate to vapors of water or humid cold air.

The gum-dextrin emulsions must after the drying be coated with a cover of lac or varnish, and then the sensitive emulsion (bromid of silver-emulsion or the like) can be applied.

In a quite similar manner emulsions of other substances can be produced, especially all kinds of colloids, for instance gelatin emulsion, casein emulsion, viscose emulsion, lac emulsions, etc., the producing of the colored elements, viz: the dividing into globules of a suitable substance, being effected by emulsifying the substance in question in a liquid (dissolved or melted) state in some liquid, in which the substance in question is totally or nearly insoluble.

It is often superfluous to provide the plate with a special cover for retaining the emulsion-globules; on the other hand a special effect can be obtained by applying the dyed globules in a fluid or gelatinous state to the plate, imparting color to the coating of the plate by diffusion the plate itself constituting a color-screen after removal of the globules. This is the case when for instance a cover of collodion is used.

Under certain circumstances a special effect can be obtained by the emulsified portions being of different kind, for instance one portion of globules consisting of lac, a second of gelatin, etc. It can hereby be obtained that the different fields of the screen present different qualities when influenced by changes of temperature, dissolvents, solution of dyes, reagents, etc.

Having thus described my invention, I claim as new and desire to secure by Letters Patent.

1. The method of producing a muticolored screen, which comprises emulsifying each of a plurality of colored liquids in a separate portion of viscous liquid, thereby producing globules of substantially uniform sizes, forming a mixture of different colors of such globules and coating a plate with said mixture of globules.

2. The method of producing a multi-colored screen, which comprises emulsifying liquids of different colors in separate portions of viscous liquid, thereby producing globules, thinning the viscous liquid by means of a solvent for the same, then decanting the thinned viscous liquid to effect the removal thereof, mixing globules of different colors, and coating a plate with the mixture of suspended globules.

3. The method of producing a multi-colored screen, which consists in emulsifying liquids of different colors in separate portions of viscous liquid, thereby producing globules, thinning the viscous liquid by means of a solvent for the same, then decanting the thinned viscous liquid to effect the removal thereof, removing and substituting the solvent by means of another liquid, mixing globules of different colors suspended in said last mentioned liquid, and coating a plate with the mixture of suspended globules.

In testimony whereof, I have signed my name to this specification in the presence of two subscribing witnesses.

JENS HERMAN CHRISTENSEN.

Witnesses:
 CECIL VILHELM SCHOU,
 VIGGO BLOM.